US012490088B2

(12) United States Patent
Zamoon et al.

(10) Patent No.: US 12,490,088 B2
(45) Date of Patent: Dec. 2, 2025

(54) SYSTEM AND METHODS FOR COMMUNICATION OF SENSOR DATA AND/OR USER CONTROL DATA

(71) Applicant: MUNTERS EUROPE AKTIEBOLAG, Kista (SE)

(72) Inventors: Ehsan Zamoon, Sollentuna (SE); Samuel Vestlin, Gothenburg (SE)

(73) Assignee: Munters Europe Aktiebolag, Kista (SE)

( * ) Notice: Subject to any disclaimer, the term of this patent is extended or adjusted under 35 U.S.C. 154(b) by 95 days.

(21) Appl. No.: 18/279,786

(22) PCT Filed: Feb. 23, 2022

(86) PCT No.: PCT/EP2022/054567
§ 371 (c)(1),
(2) Date: Aug. 31, 2023

(87) PCT Pub. No.: WO2022/184529
PCT Pub. Date: Sep. 9, 2022

(65) Prior Publication Data
US 2024/0147228 A1    May 2, 2024

(30) Foreign Application Priority Data
Mar. 4, 2021  (SE) .................................. 2150250-5

(51) Int. Cl.
*H04W 12/0431*    (2021.01)
*H04W 12/03*      (2021.01)

(52) U.S. Cl.
CPC ....... *H04W 12/0431* (2021.01); *H04W 12/03* (2021.01)

(58) Field of Classification Search
CPC . H04W 12/0431; H04W 12/03; H04W 12/04; H04W 12/50; H04W 12/55;
(Continued)

(56) References Cited

U.S. PATENT DOCUMENTS 8,737,615 B2 * 5/2014 Sato ...................... H04L 9/0838
380/255
10,009,376 B2    6/2018 Antonakakis et al.
(Continued)

FOREIGN PATENT DOCUMENTS

EP    3024285 A1 *  5/2016  ........... H04L 9/0891
GB    2 410 656 A     8/2005
(Continued)

OTHER PUBLICATIONS

International Search Report dated Jun. 9, 2022, in International Application No. PCT/EP2022/054567.
(Continued)

*Primary Examiner* — Lizbeth Torres-Diaz
(74) *Attorney, Agent, or Firm* — Venable LLP

(57) ABSTRACT

The present disclosure relates to a system (100) for communication of sensor data and/or control data within a predetermined space. The system comprises a base unit arranged to communicate wirelessly using an open network, wherein the base unit has stored therein settings for network communication using said open network, said settings comprising a first encryption key and a predetermined scheme for network communication between devices having the first encryption key. At least one node having stored therein said settings for network communication and a unit ID identifying the node. The base unit (101) and the at least one node (102; 103, 104) are arranged to communicate over an entry network. The base unit (101) is arranged to initiate a pairing procedure with at least one of the nodes of the entry network, said pairing procedure involving transmitting of additional settings for communication over a secure network to the at least one of the nodes (102; 103, 104).

17 Claims, 4 Drawing Sheets

(58) Field of Classification Search
CPC ....... H04W 12/00; H04W 8/005; G06F 21/35; G06F 21/606; H04L 2209/80
See application file for complete search history.

(56) References Cited

U.S. PATENT DOCUMENTS

| | | | |
|---|---|---|---|
| 11,115,797 B2 | 9/2021 | Takae et al. | |
| 2012/0270526 A1* | 10/2012 | De Froment | H04W 76/10 455/411 |
| 2015/0162994 A1* | 6/2015 | Rodzevski | G06F 21/34 455/39 |
| 2015/0326537 A1* | 11/2015 | Cheng | H04L 9/12 380/270 |
| 2016/0302062 A1* | 10/2016 | Lehtovirta | H04W 12/04 |
| 2017/0118585 A1* | 4/2017 | Fukuda | G06F 3/147 |
| 2018/0365404 A1* | 12/2018 | Ulrich | G06F 21/34 |
| 2020/0267540 A1* | 8/2020 | Tal | H04B 1/713 |
| 2022/0264291 A1* | 8/2022 | Tal | H04W 12/0433 |

FOREIGN PATENT DOCUMENTS

| | | |
|---|---|---|
| JP | 2012-175614 A | 9/2012 |
| WO | 2012/087572 A1 | 6/2012 |

OTHER PUBLICATIONS

International Preliminary Report on Patentability dated Mar. 1, 2023, in International Application No. PCT/EP2022/054567.
Office Action dated Sep. 12, 2024, in Taiwanese Patent Application No. 11320944770.
Examination Report dated Oct. 11, 2024, in Australian Patent Application No. 2022229661.
Office Action dated Nov. 1, 2024, in Japanese Patent Application No. 2023-551204.
Office Action dated Mar. 5, 2025, in Canadian Patent Application No. 3,211,040.

* cited by examiner

SYSTEM AND METHODS FOR COMMUNICATION OF SENSOR DATA AND/OR USER CONTROL DATA

TECHNICAL FIELD

The present invention relates to a system for communication of sensor data and/or user control data.

The present invention further relates to methods performed in said system.

BACKGROUND

Air handling units, such as evaporative humidifiers and cooler apparatuses are used to humidify and cool different types of spaces in buildings. Other types of air handling units are desiccant dehumidifiers, heat exchangers or filter arrangements.

The air handling units may be controlled to improve building performance and/or occupant comfort and/or energy optimization. The control of the air handling unit may be made based on input data from sensors. Further, the air handling unit may have a user interface for input of user preferences and/or control setting for control of the air handling unit.

SUMMARY

An object of the invention is to provide improved handling of sensor data and/or user control data. The improved handling may for example provided in a monitoring system or in a system for control of a process.

The present disclosure relates to a system for communication of sensor data and/or user control data within a predetermined space. The predetermined space may be within a building or otherwise confined or controlled space. The system comprises a base unit arranged to communicate wirelessly using an open network, wherein the base unit has stored therein settings for network communication using said open network, said settings comprising a first encryption key and a predetermined scheme for network communication between devices having the first encryption key. The system further comprises at least one node comprising a sensor unit and/or a user control unit, each said node having stored therein said settings for network communication and a unit ID uniquely identifying the node.

The base unit and the at least one node are arranged to find each other based on said settings for network communication, and communicate over an entry network using said first encryption key and in accordance with said predetermined scheme for network communication.

The base unit is arranged to initiate a pairing procedure with at least one of the found nodes of the entry network, said pairing procedure involving transmitting of additional settings for communication over a secure network to the at least one of the found nodes, said additional settings including at least one second, unique encryption key for use in secure communication over the secure network. Each paired node is added to the secure network for communication between the base unit and the paired nodes upon completion of the pairing procedure.

Thus, the system as disclosed herein provides for different levels of secure communication using an open network, for example a mesh network.

Any base unit and node having stored thereon the settings for network communication will be able to communicate with each other using a first, lower degree of security enabled by the first encryption key for encrypting all communications and the predetermined scheme defining timings for communications. Herein, communications over the open network using the first encryption key for encrypting all communications and using the predetermined scheme defining timings for communications is referred to an entry network. Thus, the encryption and the predetermined scheme, which defines timings for communications, both contribute to making it difficult for an intruder to access the entry network and/or to listen to the communications between the base unit and the node(s).

Further, a second degree of security is provided between the base unit and paired nodes. This is herein referred to as a secure network. Here, communications are performed using the second encryption key, which is unique for the particular network. This has and additional effect that a plurality of secure networks can be set-up within the same space without interfering each other.

In accordance with the solution as defined herein, the base unit has a gate-keeper functionality. It is the base unit that initiates the pairing procedure with at least one of the found nodes of the entry network. Thus, it is the base unit that controls which node(s) to be paired.

Sensor data and/or user control data may be communicated in both the entry network and the secure network. However, the degree of trust may be different between data communicated over the entry network and the secure network. For example, the base unit may be arranged to provide only sensor data and/or control data received over the secure network to a controller for process control. The controller may be implemented in the base unit or an external unit. Sensor data and/or control data received over the entry network may be used for display and/or monitoring and/or logged.

In an embodiment, the base unit is arranged to transmit a request message encrypted with the first encryption key and the respective node is arranged to receive and decode the request message encoded with the first encryption key, whereby the base unit and the respective node (102; 103, 104) have found each other, wherein the respective found node is arranged to transmit an ID message encrypted with the first encryption key, said ID message comprising a unit ID, and wherein in the base station is arranged to receive and decode the respective ID message.

The base unit may further comprise a display and user interaction means. The base unit display may then be arranged to present a list of the found nodes based on the received and decrypted unit ID(s). The user interaction means may provide for user selection of node(s) to be paired from the list of found nodes, whereupon the user-selected node(s) is registered in the based unit and the pairing procedure is initiated for the user-selected node(s). Thereby, the forming of secure networks is user controlled from the base unit.

The base unit display may be is arranged to present nodes connected to the secure network, and the user interaction means of the base unit may provide for management of the nodes connected to the secure network, said management may comprise removal of nodes.

In different embodiments, the base unit is arranged to send a time to start the secure network to the nodes to be added to the secure network and communication using the second, unique encryption key is started at both the base unit and the involved node(s) at the transmitted time, whereby the nodes are added to the secure network.

In different embodiments, at least one of the nodes comprises at least one user control unit comprising an input interface for setting a parameter relating to process control, wherein the user control unit is arranged to transmit information relating to the parameter setting to the base unit. The base unit may in turn transmit the parameter setting for process control.

The system may be a monitoring system for monitoring a one or a plurality of sensors.

The system may be a system for control of a process, such as
- injection moulding and printing,
- dry milk and other food production processes,
- production of battery cells, medical substances or other chemical processes,
- preservation of buildings, bridges, wind turbines, equipment and historical artefacts in museums,
- renovation of buildings and other structures having been damaged by moisture, or
- controlling curing process of concrete or glued articles ripening of cheese, ageing of fruit and dairy products In different embodiments, the system is an indoor climate control system for controlling an air-handling unit configured to affect the air within a building. The user control unit may then comprise an input interface for setting a temperature level and/or a humidity level and the user control unit may be arranged to transmit information relating to set temperature and/or humidity to the base unit. The air handling control unit may be arranged to be controlled based on sensor data and/or user control data transmitted to the base unit over the secure network.

The present disclosure further relates to a method for communication with at least one node, said method being performed at a base unit of a system for communication of sensor data and/or control data, said base unit having stored therein settings for network communication using said open network, said settings comprising a first encryption key and a predetermined scheme for network communication between devices having the first encryption key. The method comprises
- transmitting, over an open, wireless network, a join request message, said join request message being transmitted using the predetermined scheme and encoded using said first encryption key,
- receiving over the open, wireless network at least one ID message comprising a unit ID of a joined node, said received ID message being communicated using the predetermined scheme and encrypted using the first encryption key and,
- decoding the received response message,
- initiating a pairing procedure with at least one of the joined nodes, said pairing procedure involving transmitting additional settings for communication over a secure network to the at least one of the joined nodes (102; 103, 104), said additional settings including at least one second, unique encryption key for use in secure communication over the secure network, and
- initiating secure communication with the paired node(s), in which secure communication the at least one unique, second encryption key is used for encryption/decryption of communicated messages.

The present invention also relates to a method A method performed in a node for communication with a base unit of a system for communication of sensor data and/or control data, said node having stored therein settings for network communication using an open network and a unique unit ID, said settings comprising a first encryption key and a predetermined scheme for network communication between devices having the first encryption key. The method comprises
- receiving, over the open, wireless network, a join request message from the base unit, said received join request message being communicated using the predetermined scheme for network communication and encoded using the first encryption key,
- decoding the received join request message,
- upon successful decoding of the join request message, transmitting (403) over the open, wireless network an ID message comprising the unit ID of the node, said ID message being transmitted using the predetermined scheme for network communication and encoded using the first encryption key,
- receiving over the open network additional settings for communication over a secure network, said additional settings for communication including at least one unique, second encryption key, and
- initiating secure communication, in which secure communication the at least one unique, second encryption key is used for encryption/decryption of communicated messages.

The present disclosure further relates to a computer program comprising instructions which, when the program is executed by a computer, cause the computer to carry out any of the herein disclosed methods.

DETAILED DESCRIPTION

The present disclosure relates to a system for communication of sensor data and/or user control data within a predetermined space. The predetermined space may be within a building or otherwise confined or controlled space. The system comprises a base unit arranged to communicate wirelessly using an open network, wherein the base unit has stored therein settings for network communication using said open network, said settings comprising a first encryption key and a predetermined scheme for network communication between devices having the first encryption key. The system further comprises at least one node comprising a sensor unit and/or a user control unit, each said node having stored therein said settings for network communication and a unit ID uniquely identifying the node. The base unit and the at least one node are arranged to find each other based on said settings for network communication, and communicate over an entry network using said first encryption key and in accordance with said predetermined scheme for network communication. The base unit is arranged to initiate a pairing procedure with at least one of the found nodes of the entry network, said pairing procedure involving transmitting of additional settings for communication over a secure network to the at least one of the found nodes, said additional settings including at least one second, unique encryption key for use in secure communication over the secure network. Each paired node is added to the secure network for communication between the base unit and the paired nodes upon completion of the pairing procedure.

Figure 1:
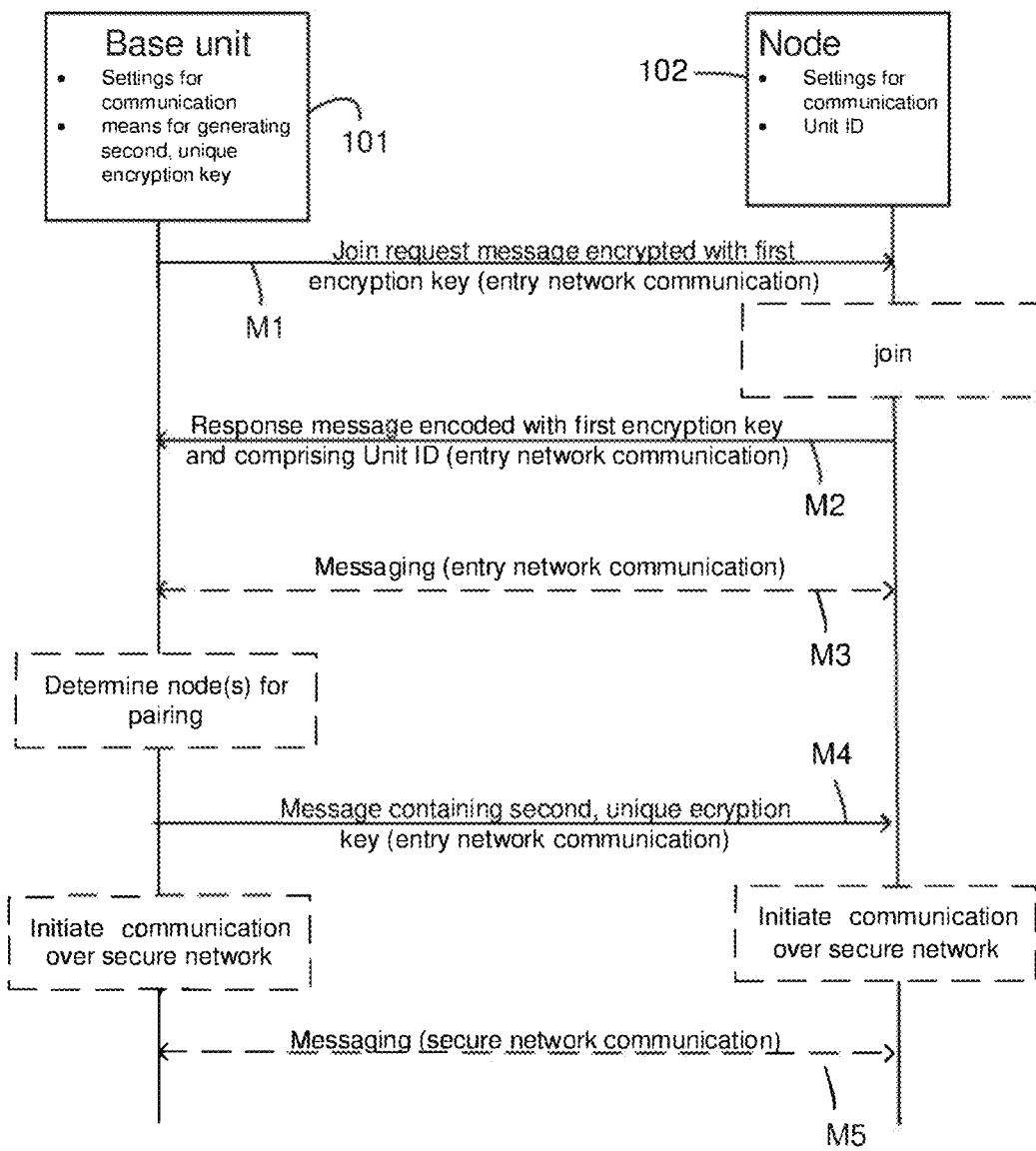
FIG. 1 is a signalling scheme illustrating examples of signalling in a system for communication of sensor data and/or user control data.

In FIG. 1, a signal scheme illustrates example signalling for the system above for communication of sensor data and/or user control data within a predetermined space.

The system may be a monitoring system for monitoring a one or a plurality of sensors.

The system may be a system for control of a process, such as
- injection moulding and printing,
- dry milk and other food production processes,
- production of battery cells, medical substances or other chemical processes,
- preservation of buildings, bridges, wind turbines, equipment and historical artefacts in museums,
- renovation of buildings and other structures having been damaged by moisture, or
- controlling curing process of concrete or glued articles ripening of cheese, ageing of fruit and dairy products In different embodiments, the system is an indoor climate control system for controlling an air-handling unit configured to affect the air within a building.

The signal scheme is a scheme for communication between a base unit 101 and at least one node 102.

The base unit 101 may be a base unit connected to or integrated with an air-handling unit configured to affect the air within a building. The base unit 101 is then part of an indoor climate control system for controlling an air handling unit.

The base unit has stored therein settings for wireless network communication using an open network, said settings comprising a first encryption key and a predetermined scheme for network communication between devices having the first encryption key. The settings may further comprise an entry network ID, or PAN ID for the entry network. The entry network ID is used to uniquely identify an entry network. Devices on the same network must share the network ID(s).

The settings are common for units, which are intended to be connected to the system. In practice, the settings are unique for one or more manufacturers of units of and/or intended for use with the system for communication of sensor data and/or user control data. Characteristically, the settings are stored in the respective unit at manufacture thereof. The settings are kept secret for preventing unauthorized use. The units having the settings are arranged to communicate r with each other according to the predetermined scheme in an entry network. The at least one node 102 comprises for example a user control unit for and/or a sensor unit.

In order to find nodes intended to communicate with the base unit 101 in the entry network, the base unit transmits a join request message M1 encrypted with the first encryption key over an open, wireless network using the predetermined communication scheme. The node(s) is arranged to receive and decode the join request message when within communication range over the open, wireless network. If the node can receive and decode the join request message, the node has joined the entry network. When joined, the node transmits a response message M2. The response message M2 is transmitted according to the predetermined scheme and encrypted using the first encryption key. The response message comprises a unit ID of the node.

It is assumed that the base unit and the nodes are synchronized to allow for the communication of messages according to the predetermined scheme. Such synchronisation is known in the art and not discussed in detail herein. For example, the respective node may comprise a crystal calibrated by means of the network.

Upon reception and decoding of the response message M2, the base unit 101 determines that a joined node has been found.

The base unit 101 and the node 102 are arranged to communicate with other according to the predetermined scheme using the first encryption key for encryption of messages. This is illustrated as a two-directional message M3 in FIG. 1.

After a decision at the base unit to perform pairing with one or more of the joined nodes to enable secure communication, the base unit transmits a message M4 comprising additional settings for communication over the secure network to the selected nodes. The settings comprises at least second, unique encryption key for secure communication. The settings may further comprise a timing for start of secure communication between the node 102 and base unit 101.

The base unit 101 and the node 102 are then connected for secure communication and therefore arranged to communicate securely using the second, unique encryption key. The secure communication is preferably performed according to the predetermined scheme. Alternatively, secure communication is performed according to another scheme for secure communication, wherein the scheme for secure communication may be pre-stored in the base unit and the nodes. The secure communication is illustrated as a two-directional message M5 in FIG. 1.

Figure 2:
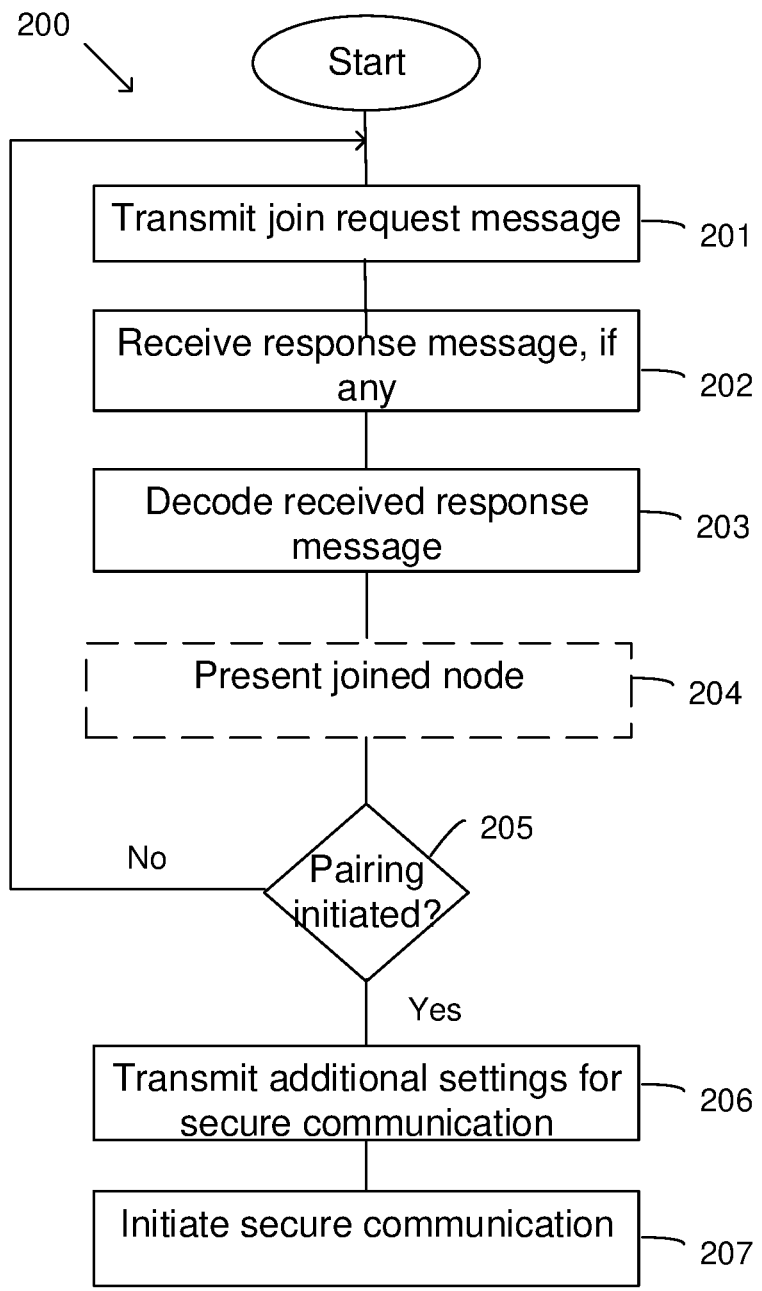
FIG. 2 is a flow chart illustrating an example of a method for communication with at least one node, said method being performed at a base unit of a system for communication of sensor data and/or user control data.

In FIG. 2, an exemplified method 200 for communication with at least one determined node is illustrated. The method 200 is performed at a base unit of a system for communication of sensor data and/or user control data, said base unit having stored therein settings for network communication using said open network, said settings comprising a first encryption key and a predetermined scheme for network communication between devices having the first encryption key.

The method 200 comprises a step of transmitting 201, over an open, wireless network, a join request message, said join request message being transmitted using the predetermined scheme and encoded using said first encryption key, The method 200 further comprises a step of receiving 202 over the open, wireless network at least one response message comprising a unit ID of a joined node, said received response message being communicated using the predetermined scheme and encrypted using the first encryption key.

The method further comprises a step of decoding 203 the received response message.

A pairing procedure may then be either automatically or manually initiated 205.

In a user-initiated example, the joined nodes are presented 203 at a user interface for user selection of node(s) to be paired, and a user selection of at least one node for pairing is detected. Then, the at least one user selected node is registered in the base unit and the pairing procedure is initiated for the user selected node(s).

The pairing procedure involves transmitting 206 additional settings for communication over a secure network to the at least one of the joined nodes (102; 103, 104), said additional settings including at least one second, unique encryption key for use in secure communication over the secure network.

The method further comprises a step of initiating 207 secure communication with the paired node(s), in which secure communication the at least one unique, second encryption key is used for encryption/decryption of communicated messages. The initiating 207 of the secure communication may comprise sending a time to start the secure network to the nodes to be added to the secure network. Communication using the second, unique encryption key is then started at both the base unit and the involved node(s) at the transmitted time.

Figure 3:
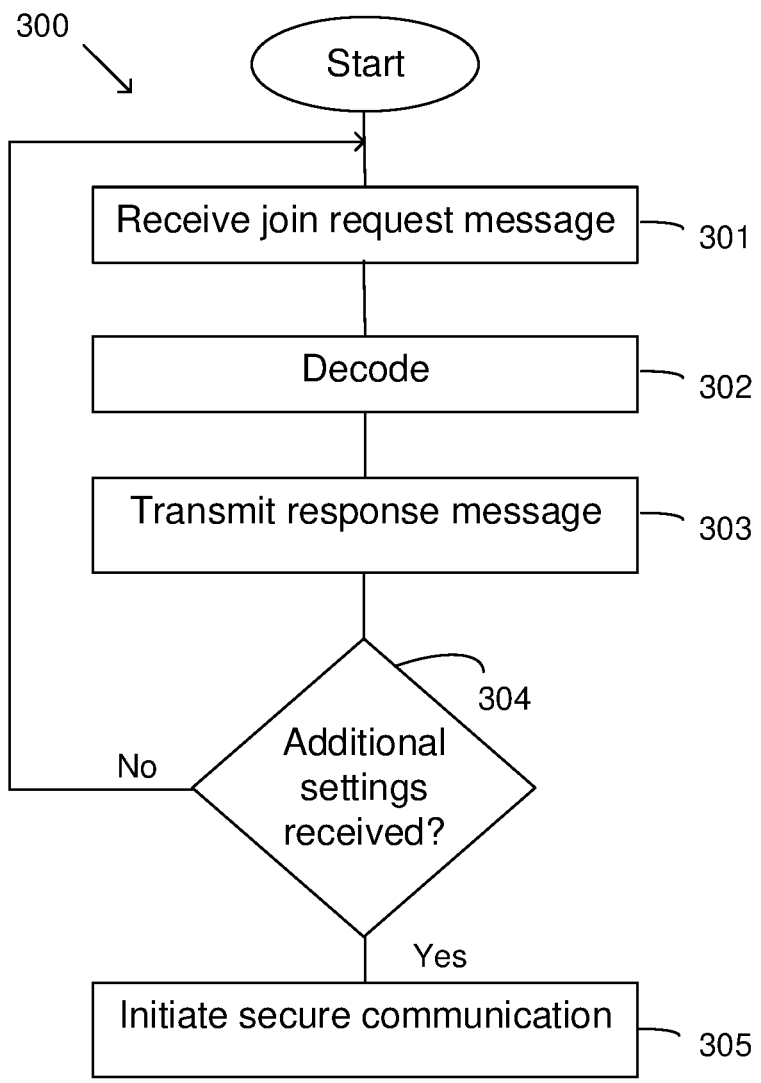
FIG. 3 is a flow chart illustrating an example of a method performed at a node for communication with a base unit of a system for communication of sensor data and/or user control data.

In FIG. 3, an example method 300 is illustrated performed in a node for communication with a base unit of a system for communication of sensor data and/or control data, said node having stored therein settings for network communication using an open network and a unique unit ID, said settings comprising a first encryption key and a predetermined scheme for network communication between devices having the first encryption key.

The node comprises for example at least one sensor unit. The sensor unit(s) may be arranged to detect at least one of
relative humidity,
dew point,
normal atmospheric gases such as oxygen, nitrogen, carbon dioxide,
volatile organic compounds, VOC,
temperature,
chemical substance(s) in gaseous form such as radon,
air pressure,
sound pressure level,
electromagnetic fields,
light conditions,
aerosols, and
particles.

In an example, the node comprises at least one user control unit. The user control unit may comprise an input interface for setting a parameter relating to process control, The method comprises receiving 301, over the open, wireless network, a join request message from the base unit, said received join request message being communicated using the predetermined scheme for network communication and encoded using the first encryption key.

The method further comprises a step of decoding 302 the received join request message. Upon successful decoding of the join request message, the node is considered joined.

The method further comprises a step of upon successful decoding of the join request message, transmitting 303 over the open, wireless network a response message in the form of an ID message comprising the unit ID of the node. The ID message is transmitted using the predetermined scheme for network communication and encoded using the first encryption key. This procedure may be repeated at predetermined intervals until settings for secure communication are received.

The method further comprises a step of receiving 304 over the open network additional settings for communication over a secure network, said additional settings for communication including at least one unique, second encryption key.

The method further comprises initiating 305 secure communication, in which secure communication the at least one unique, second encryption key is used for encryption/decryption of communicated messages. The initiating 305 of the secure communication may comprise receiving from the base unit a time to start the secure network. Communication using the second, unique encryption key is then started at both the base unit and the node(s) at the transmitted time.

When the node comprises a user control unit, the user control unit may transmit to the base unit information relating to the parameters set at the user control unit. These transmissions may be performed in the entry network and/or secure network.

When the node comprises a sensor unit, the sensor unit may transmit to the base unit sensor data. These transmissions may be performed in the entry network and/or secure network.

The methods as described herein may be implemented in computer programs comprising instructions, which, when the program is executed by a computer, cause the computer to carry out the methods.

Figure 4:
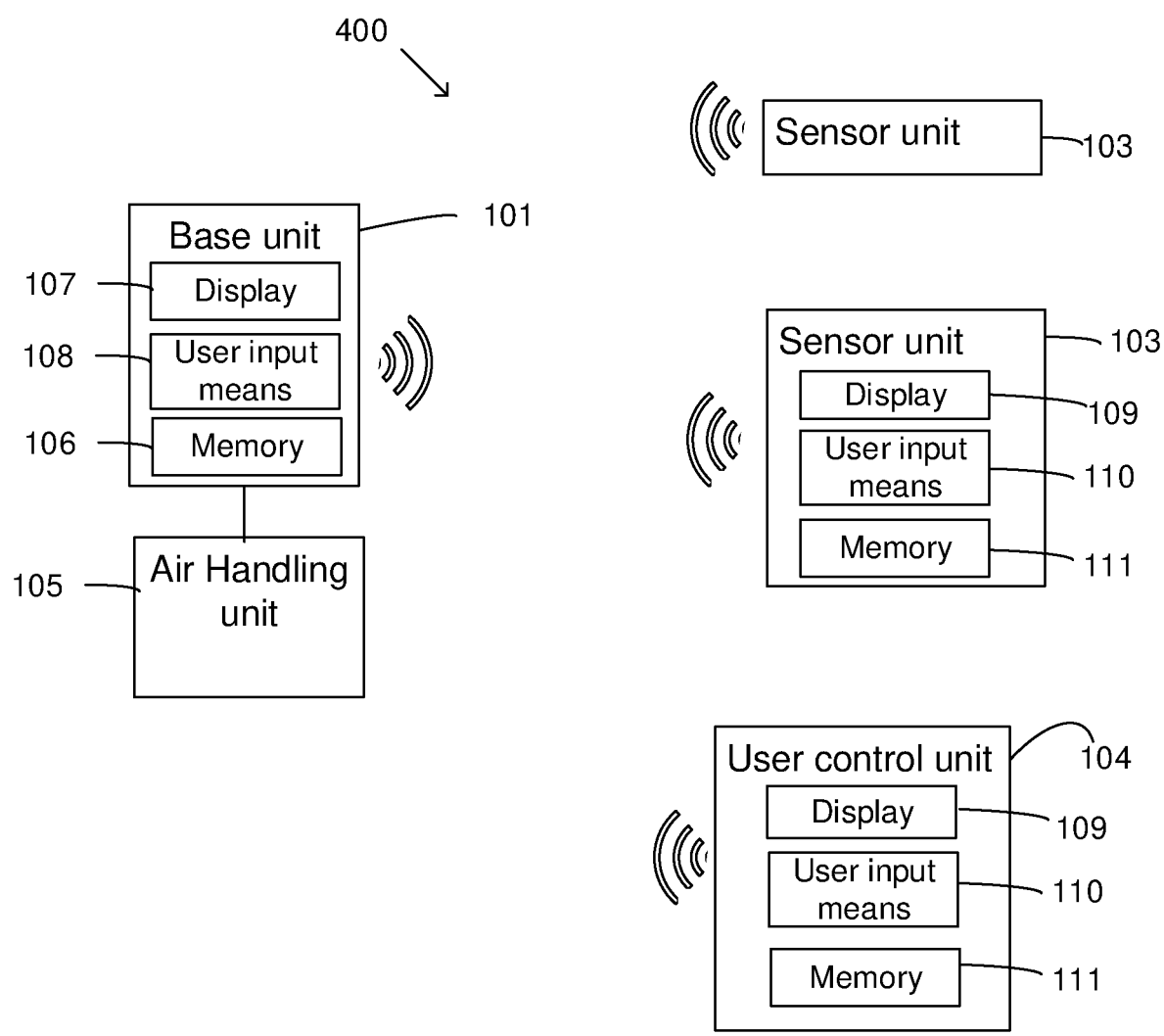
FIG. 4 is a block scheme illustrating an example of an indoor climate control system for controlling an air-handling unit configured to affect the air within a building.

In FIG. 4, the system as disclosed herein is disclosed in relation to an indoor climate control system 400 for controlling an air handling unit 105 configured to affect the air within a building is illustrated.

The air-handling unit 105 is arranged to cool and/or heat and/or dry and/or dehumidify and/or purify the air within a building. The air-handling unit 105 forms for example an evaporative humidifier and/or cooler. The air-handling unit 105 is then used to humidify and/or cool different types of spaces in buildings. Other types of air handling units are desiccant dehumidifiers, heat exchangers or filter arrangements.

The system 400 comprises in an example a base unit 101 connected to the air-handling unit 105. In an example, the base unit 101 is a stand-alone base unit 101. Alternatively, the base unit is integrated with the air-handling unit 105.

The base unit 101 function is arranged to provide data to the air handing unit for use in control of the air-handling unit. The base unit 101 functions as an interface between the air handing unit 105 and remote units such as sensor units 103 and/or user control units 104.

The base unit 101 may comprise a memory 106 for storage of data and a processor. The base unit 101 may comprise a display 107 and user interaction means 108 for input of user data.

The base unit 101 has stored therein settings comprising a first encryption key and a predetermined scheme for network communication between devices having the first encryption key. The settings identify an origin of the communication system and optionally the air-handling unit 105 to which it is connected or integrated with. The settings are characteristically coded in hardware or software of the base unit at manufacture. At least a part of the settings is preferably hidden in the hardware or software, whereby unauthorized access can be prevented. The settings may be stored in the memory 106.

The base unit 101 is arranged to communicate wirelessly using a wireless open network and the settings as discussed herein. A network using a wireless, open network and the settings discussed herein is referred to as an entry network. The open network may be a mesh network.

At least one node 103, 104 intended for communication with the base unit may be within a communication range within the wireless, open network to the base unit 101. The node 103, 104 may comprise a memory 111 for storage of data and a processor. The node 103, 104 may comprise a display 109 and/or user interaction means 110 for input of user data.

Each node has stored therein the same settings as stored in the base unit. As discussed above, the settings identify an origin of the system for communication of sensor data and/or user control data and optionally the air-handling unit, for which the system for communication of sensor data and/or user control data is intended. As mentioned above, the settings are characteristically coded in hardware or software of the node at manufacture. At least a part of the settings is preferably hidden in the hardware or software, whereby unauthorized access can be prevented. Each node has further stored therein a unit ID identifying the node. The settings and the unit ID may be stored in the memory 111.

As is clear from the above, each at least one node comprises a sensor unit 103 and/or a user control unit 104.

The user input means 110 of the user control unit 104 may comprise an input interface for setting a temperature level and/or a humidity level.

In this application, the at least one sensor unit 103 may comprise at least one sensor for sensing at least one of
relative humidity,
dew point, and
temperature The base unit 101 and the at least one node 103, 104 are arranged find each other based on said settings for network communication, and communicate over the entry network using said first encryption key and in accordance with the predetermined scheme for network communication.

In detail, the base unit 101 is arranged to transmit a request message encrypted with the first encryption key and the respective node is arranged to receive and decode the request message encoded with the first encryption key, whereby the base unit 101 and the respective node (102; 103, 104) are joined. The respective joined node is then arranged to transmit a response message in the form of an ID message encrypted with the first encryption key, said ID message comprising a unit ID. The base station is then arranged to receive and decode the respective ID message.

Communications is available over the entry network in accordance with the predetermined scheme for communication between units having the settings as discussed herein. The predetermined scheme defines characteristically time slots for communication. The communication may for example be based on Time Synchronized Channel Hopping, TSCH. This means that the time slots for communication are small and therefore the system is very energy efficient. The communications over the entry network is encrypted using the first encryption key.

As stated above, the base unit 101 and the at least one node 103, 104 are arranged to communicate with each other over the entry network. For example, the user control unit(s) 104 may be arranged to transmit information relating to set temperature and/or humidity to the base unit 101 over the entry network. The base unit 101 is then arranged to receive the transmitted information. The base unit 101 may be arranged to display at least a part of the received information relating to set temperature and/or humidity.

For example, the senor unit(s) 103 may be arranged to transmit sensor data to the base unit 101 over the entry network. The base unit 101 is then arranged to receive the transmitted sensor data. The base unit may be arranged to display at least a part of the received sensor data.

In an option, data transmitted from the user control unit(s) 104 and/or sensor unit(s) 103 over the entry network is not used for control of the air-handling unit.

Further, the base unit 101 is arranged to initiate a pairing procedure with at least one of the nodes of the entry network. The pairing procedure involves transmitting additional settings for communication over a secure network to the at least one of the joined nodes. The additional settings may also refer to as credentials for secure communication. The additional settings include at least one second, unique encryption key for the secure network and for use in secure communication over the secure network. Preferably, at least one sensor unit 103 and at least one user control unit 104 are connected to the secure network.

In an example, the base unit display 107 is arranged to present a list of joined, unpaired nodes. The user interaction means 108 of the base unit 102 provide for user selection of node(s) to be paired from the list, whereupon the user-selected node(s) is registered in the based unit 102 and the pairing procedure is performed for the user-selected node(s).

Pairing is a process used in computer networking that helps set up a linkage between computing devices to allow communications between them. In the context of the present invention, a linkage between the computing devices is already present, as described above, using the settings. In the context of the invention, pairing is performed to set up a linkage for communication in a secure network.

In an example, the additional settings comprise in addition to the second, unique encryption key a secure network ID, or PAN ID for the secure network. In an example, the unique network ID is used for uniquely identifying a secure network. As mentioned in relation to the entry network, devices on the same network must then share the network ID(s).

In the pairing process, the second, unique encryption key for use in secure communication over the secure network is communicated to the node(s). The transmitted second, unique encryption key is then stored in the respective node 103, 104 and used in subsequent secure communication. Further, when present the secure network ID, or PAN ID for the secure network is also communicated to the node(s) and stored therein.

As is clear from above, the second, unique encryption key for communication over a secure network is transmitted over the entry network using the predetermined scheme for communication. The same applies for the secure network ID, or PAN ID for the secure network, when present.

The encryption used in secure communication is characteristically a symmetric block cipher. For example, Advanced Encryption Standard, AES, is used for encryption (and subsequent decryption). The block length of the block cipher used in AES is for example 128 or 192 or 256 bits.

In an example, the second, unique encryption key, i.e. the block, is generated at the base unit in connection with the pairing. In accordance with this example, the second, unique encryption key is not stored in any of the units until use. This increases the security. The risk of unauthorized access to the second encryption key is minimized. The secure network ID, or PAN ID for the secure network may also be generated at the base unit in connection with the pairing in the same way as the second, unique encryption key.

Secure communication is initiated upon completion of the pairing procedure. The display of the base unit is in an example arranged to present nodes connected to the secure network. The user interaction means may provide for management of the nodes connected to the secure network, said management may comprise removal of nodes. This means that presented paired nodes can be selected to be unpaired and presented unpaired nodes can be selected to be paired. Removal of a node, i.e. unpairing of a node, may comprise that the base unit informs the node that it is unpaired and the node in response thereto removes or compromises the second unique encryption key so it can no longer be used.

The base unit may be arranged to send a time to start the secure network to the nodes to be added to the secure network and communication using the second, unique encryption key is started at both the base unit and the involved node(s) at the transmitted time, whereby the nodes are added to the secure network.

At least part of the data communicated from the sensor unit(s) and/or user control unit(s) to the base unit over the secure network is provided to the air-handling unit for control thereof. Thus, characteristically, the base unit is arranged to use data received from the node(s) over the entry network for display and possible other uses not affecting the air-handling unit. The base unit is further arranged to use data received from the node(s) over the secure network for transfer for control of the air-handling unit. Further, software updates transmitted from the base unit to the nodes may only be permitted over the secure network.

Characteristically, the open network used is a mesh network. Thus, the solution as provided herein allows for communication with joined nodes in an entry network and secure communication in a secure network also when the base unit and the sensor unit(s)/user control unit(s) are not in direct communication.

The invention claimed is:

1. A system for communication of sensor data and/or control data within a predetermined space, the system comprising:
 a base unit arranged to communicate wirelessly using an open network, wherein the base unit has stored therein settings for network communication of sensor data and/or user control data, wherein the settings for network communication comprise a first encryption key and a predetermined scheme for network communication with devices having the first encryption key, wherein the predetermined scheme defines time slots for network communication; and
 at least one node arranged to communicate wirelessly using the open network, the at least one node comprising a sensor unit and/or a user control unit, the at least one node having stored therein the settings for network communication and a unit identifier (ID) identifying the node, the settings for network communication being unique for one or more manufacturers of the base unit and of the sensor unit and/or the user control unit of the at least one node,
 wherein the base unit and the at least one node are arranged to find each other based on the settings for network communication, and communicate over an entry network using the first encryption key and in accordance with the predetermined scheme for network communication,
 wherein encryption using the first encryption key and the predetermined scheme defining time slots for network communication both contribute to making it difficult for an intruder to access the entry network and to listen to the communications between the base unit and the at least one node,
 wherein the base unit is arranged to initiate a pairing procedure with at least one of found nodes of the entry network, the pairing procedure involving transmitting of additional settings for communication over a secure network to the at least one of the found nodes, the additional settings including at least one second, unique encryption key for use in secure communication over the secure network, and
 wherein each paired node is added to the secure network upon completion of the pairing procedure.

2. The system according to claim 1, wherein the base unit is arranged to transmit a request message encrypted with the first encryption key and a respective node is arranged to receive and decode the request message encoded with the first encryption key, whereby the base unit and the respective node have found each other,
 wherein the respective found node is arranged to transmit an ID message encrypted with the first encryption key, the ID message comprising a unit ID, and
 wherein the base station is arranged to receive and decode the respective ID message.

3. The system according to claim 1, wherein the base unit further comprises a display and user interaction means.

4. The system according to claim 3, wherein the base unit display is arranged to present a list of the found nodes based on the received and decrypted unit ID(s) and wherein the user interaction means provides for user selection of node(s) to be paired from the list of found nodes, whereupon the user selected node(s) is registered in the base unit and the pairing procedure is initiated for the user selected node(s).

5. The system according to claim 3, wherein the base unit display is arranged to present nodes connected to the secure network, and wherein the user interaction means of the base unit provides for management of the nodes connected to the secure network, the management selectively including removal of nodes.

6. The system according to claim 1, wherein the base unit is arranged to send a time to start the communication over the secure network to the nodes to be added to the secure network and communication using the second, unique encryption key is started at both the base unit and the nodes at the transmitted time, whereby the nodes are added to the secure network.

7. The system according to claim 1, wherein at least one sensor unit and at least one user control unit are connected to the secure network.

8. The system according to claim 1, wherein at least one of the nodes comprises at least one user control unit comprising an input interface for setting a parameter relating to process control, wherein the user control unit is arranged to transmit information relating to the parameter setting to the base unit.

9. The system according to claim 1, wherein at least one of the nodes comprises at least one sensor unit arranged to detect at least one of relative humidity, dew point, normal atmospheric gases such as oxygen, nitrogen, carbon dioxide, volatile organic compounds (VOC), temperature, chemical substance(s) in gaseous form such as radon, air pressure, sound pressure level, electromagnetic fields, light conditions, aerosols, and particles.

10. The system according to claim 1, wherein the base unit is arranged to provide only sensor data and/or control data received over the secure network to a controller for process control.

11. The system according to claim 1, wherein the open network is a mesh network.

12. The system according to claim 1, wherein the system is an indoor climate control system for controlling an air handling unit configured to affect the air within a building.

13. The system according to claim 12, wherein the user control unit comprises an input interface for setting a temperature level and/or a humidity level and wherein the user control unit is arranged to transmit information relating to set temperature and/or humidity to the base unit.

14. A method for communication with at least one node, the method being performed at a base unit of a system for communication of sensor data and/or control data, the base unit being arranged to communicate wirelessly using an open network and having stored therein settings for network communication of sensor data and/or user control data, the settings being unique for one or more manufacturers of the base unit, and the settings comprising a first encryption key and a predetermined scheme for network communication over an entry network with devices having the first encryption key, the method comprising:

- transmitting, over the open, wireless network, a join request message, the join request message being transmitted using the predetermined scheme and encrypted using the first encryption key, wherein the predetermined scheme defines time slots for network communication, whereby encryption using the first encryption key and the predetermined scheme defining time slots for network communication over the entry network both contribute to making it difficult for an intruder to access the entry network and listen to the communications between the base unit and the at least one node;
- receiving over the entry network at least one identifier (ID) message comprising a unit ID of a joined node, the received ID message being communicated using the predetermined scheme and encrypted using the first encryption key;
- decoding the received ID message;
- initiating a pairing procedure with at least one of the joined nodes, the pairing procedure involving transmitting additional settings for communication over a secure network to the at least one of the joined nodes, the additional settings including at least one second, unique encryption key for use in secure communication over the secure network; and
- initiating secure communication with the paired node(s), the secure communication using the at least one unique, second encryption key for encryption/decryption of communicated messages.

15. The method according to claim 14, further comprising a step for selecting nodes for comparison, comprising:
- presenting the joined nodes via a user interface for user selection of node(s) to be paired; and
- detecting a user selection of at least one node for pairing, whereupon the at least one user selected node is registered in the base unit and the pairing procedure is initiated for the user selected node(s).

16. A method performed in a node for communication with a base unit, the node being arranged to communicate wirelessly using an open network and having stored therein a unique unit identifier (ID) and settings for network communication of sensor data and/or user control data, the settings being unique for one or more manufacturers of the node unit and the base unit, and the settings comprising a first encryption key and a predetermined scheme for network communication over an entry network with devices having the first encryption key, the method comprising:

- receiving, over the open, wireless network, a join request message from the base unit, the received join request message being communicated using the predetermined scheme for network communication and encoded using the first encryption key, wherein the predetermined scheme defines time slots for network communication over the entry network, whereby encryption using the first encryption key and the predetermined scheme defining time slots for network communication both contribute to making it difficult for an intruder to access the entry network and/or to listen to the communications between the base unit and the node;
- decoding the received join request message;
- upon successful decoding of the join request message, transmitting over the entry network an ID message comprising the unique unit ID of the node, the ID message being transmitted using the predetermined scheme for network communication and encoded using the first encryption key;
- receiving over the entry network additional settings for communication over a secure network, the additional settings for communication including at least one unique, second encryption key; and
- initiating secure communication, the secure communication using the at least one unique, second encryption key for encryption/decryption of communicated messages.

17. A non-transitory, computer-readable medium storing a program comprising instructions which, when the program is executed by a computer, cause the computer to carry out the method according to claim 16.

* * * * *